(12) United States Patent
Mogi

(10) Patent No.: US 7,529,857 B2
(45) Date of Patent: May 5, 2009

(54) DATA PROCESSING APPARATUS AND DATA TRANSFER CONTROL METHOD

(75) Inventor: Hisashi Mogi, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 820 days.

(21) Appl. No.: 11/110,686

(22) Filed: Apr. 21, 2005

(65) Prior Publication Data
US 2005/0265336 A1    Dec. 1, 2005

(30) Foreign Application Priority Data
May 31, 2004    (JP)    .............................. 2004-161757

(51) Int. Cl.
*G06F 15/16*    (2006.01)
(52) U.S. Cl. ...................... 709/250; 709/210
(58) Field of Classification Search ................. 370/389; 709/250, 210; 711/100; 710/21, 22
See application file for complete search history.

(56) References Cited

U.S. PATENT DOCUMENTS

| | | | | |
|---|---|---|---|---|
| 5,835,492 | A * | 11/1998 | Aimoto et al. ............... | 370/389 |
| 5,860,119 | A * | 1/1999 | Dockser ...................... | 711/156 |
| 6,629,285 | B1 * | 9/2003 | Gerendai et al. ............ | 714/748 |
| 6,823,402 | B2 * | 11/2004 | Smith et al. .................. | 710/22 |
| 7,013,419 | B2 * | 3/2006 | Kagan et al. ................. | 714/749 |
| 2003/0131163 | A1 * | 7/2003 | Ishii et al. ...................... | 710/52 |
| 2004/0044796 | A1 * | 3/2004 | Vangal et al. ................ | 709/250 |
| 2004/0225760 | A1 * | 11/2004 | Lee .............................. | 710/22 |
| 2004/0230717 | A1 * | 11/2004 | Funatsu et al. ................ | 710/22 |
| 2005/0182888 | A1 * | 8/2005 | Murotani et al. ............... | 711/1 |
| 2006/0168147 | A1 * | 7/2006 | Inoue et al. .................. | 709/219 |
| 2007/0124341 | A1 * | 5/2007 | Lango et al. ................. | 707/202 |
| 2008/0052479 | A1 * | 2/2008 | Takahashi et al. ........... | 711/162 |

FOREIGN PATENT DOCUMENTS

JP        05-334232 A        12/1993

* cited by examiner

*Primary Examiner*—Anthony Mejia
(74) *Attorney, Agent, or Firm*—Pillsbury Winthrop Shaw Pittman, LLP

(57) ABSTRACT

An apparatus includes a unit which forms N (N≧2K) packets corresponding to N data blocks, an end flag and an identifier which identifies a data transfer process being attached to each of the last K (K≧2) packets among the N packets, K (K≧2) memory control units which control K (K≧2) memories, units which are respectively provided in the memory control units and each perform a process of writing each packet into a memory and issue notification of completion relating to the data transfer process corresponding to the identifier attached to the packet having the end flag attached thereto, and a unit which notifies completion of the data transfer process to a processor when notification of completion relating to the data transfer process is issued from all of the K memory control units.

10 Claims, 5 Drawing Sheets

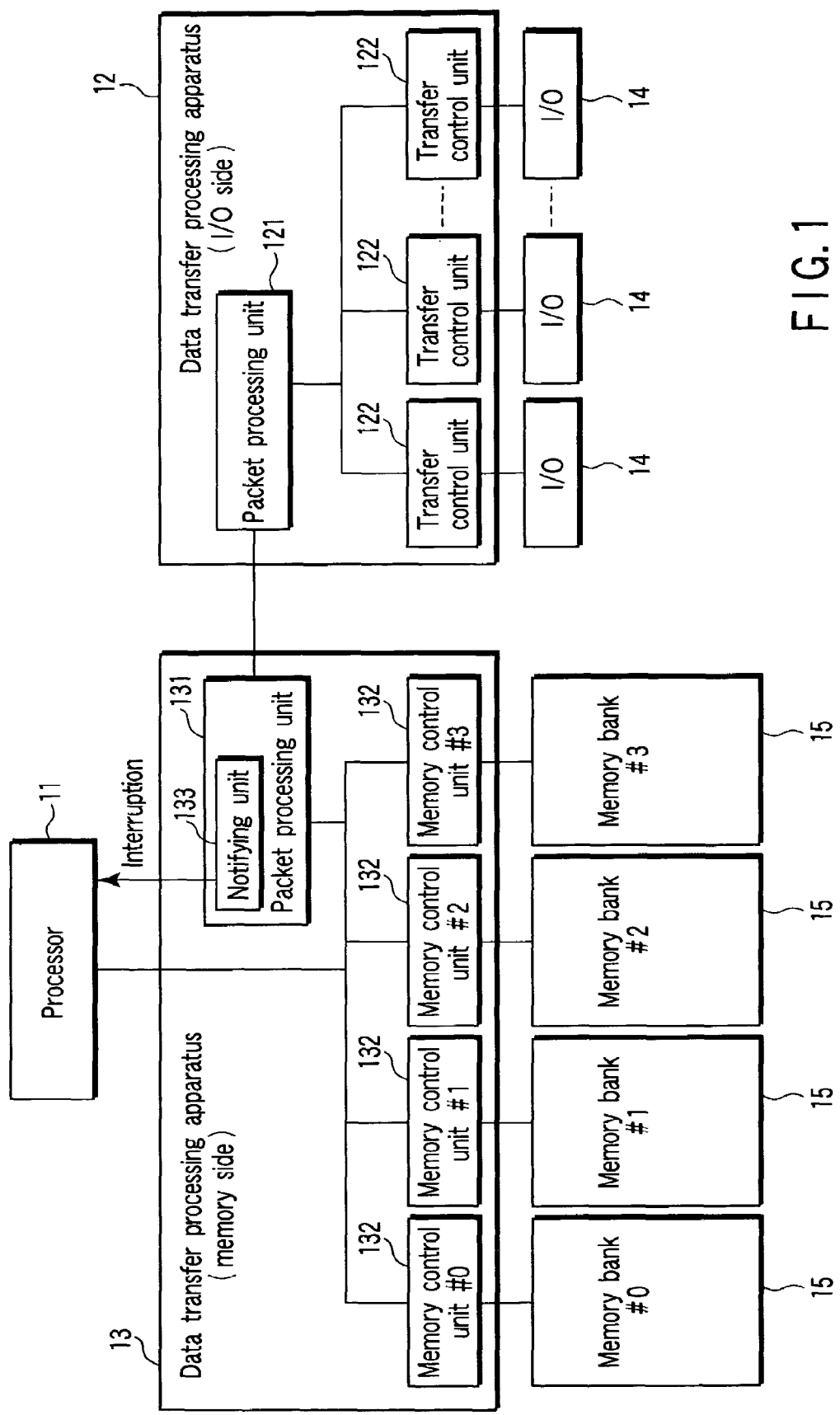
F I G. 1

DATA PROCESSING APPARATUS AND DATA TRANSFER CONTROL METHOD

CROSS-REFERENCE TO RELATED APPLICATIONS

This application is based upon and claims the benefit of priority from prior Japanese Patent Application No. 2004-161757, filed May 31, 2004, the entire contents of which are incorporated herein by reference.

BACKGROUND OF THE INVENTION

1. Field of the Invention

This invention relates to a data processing apparatus which transfers data from a transmission-side device to a reception-side device in response to a data transfer request from a processor and a data transfer control method applied to the data processing apparatus.

2. Description of the Related Art

In recent years, in a data processing apparatus such as a system containing a computer, a data transfer control function of automatically performing a data transfer process from a transmission-side device to a reception-side device in response to a data transfer request from a processor in order to reduce the load on the processor has been utilized. The processor can perform a process other than the above data transfer process in a period until the data transfer process is completed.

As a representative data transfer function, a direct memory access (DMA) transfer function is known.

In Jpn. Pat. Appln. KOKAI Publication No. 5-334232, there is disclosed a DMA transfer control apparatus which detects completion of a DMA transfer, provided that the number of data transfers performed becomes equal to the total number of data transfers previously specified.

However, generally, not all of the data items are always actually written into a memory controlled by the reception-side device even when data transfer to the reception-side device is completed. Therefore, in order to determine whether or not all of the data items has actually been written into the memory, it is necessary to inquire of the reception-side device about whether the write process has been completed or not. Due to the overhead caused by the inquiry, the timing at which completion of the data transfer is notified to the processor is delayed.

Therefore, it is required to realize a mechanism which efficiently notifies completion of data transfer to the processor.

BRIEF SUMMARY OF THE INVENTION

According to an aspect of the present invention, there is provided a data processing apparatus including a processor, a reception-side device which controls K ($K \geq 2$) memories which can be operated in parallel, and a transmission-side device which transfers data to the reception-side device in response to a data transfer request from the processor, comprising a packet forming unit which is provided in the transmission-side device and forms N ($N \geq 2K$) packets corresponding to N ($N \geq 2K$) data blocks, the N data blocks configuring data to be transferred in a data transfer process specified by the data transfer request, and an end flag and an identifier which identifies the data transfer process being attached to each of the last K ($K \geq 2$) packets among the N packets; K ($K \geq 2$) memory control units which are provided in the reception-side device and respectively control the K ($K \geq 2$) memories; a packet processing unit which is provided in the reception-side device and distributes the N packets from the transmission-side device to the K memory control units to sequentially allocate the N packets to the K memories in the order of transmission; units which are respectively provided in the memory control units and each perform a process of writing each packet received from the packet processing unit into a corresponding one of the memory control units and perform a process of issuing notification of completion relating to the data transfer process corresponding to the identifier attached to the packet having the end flag attached thereto when the packet having the end flag attached thereto is written into the corresponding memory; and a notifying unit which is provided in the reception-side device and notifies completion of the data transfer process to the processor when notification of completion relating to the data transfer process is issued from all of the K memory control units.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing the configuration of a data processing apparatus according to one embodiment of this invention;

DETAILED DESCRIPTION OF THE INVENTION

Figure 2:
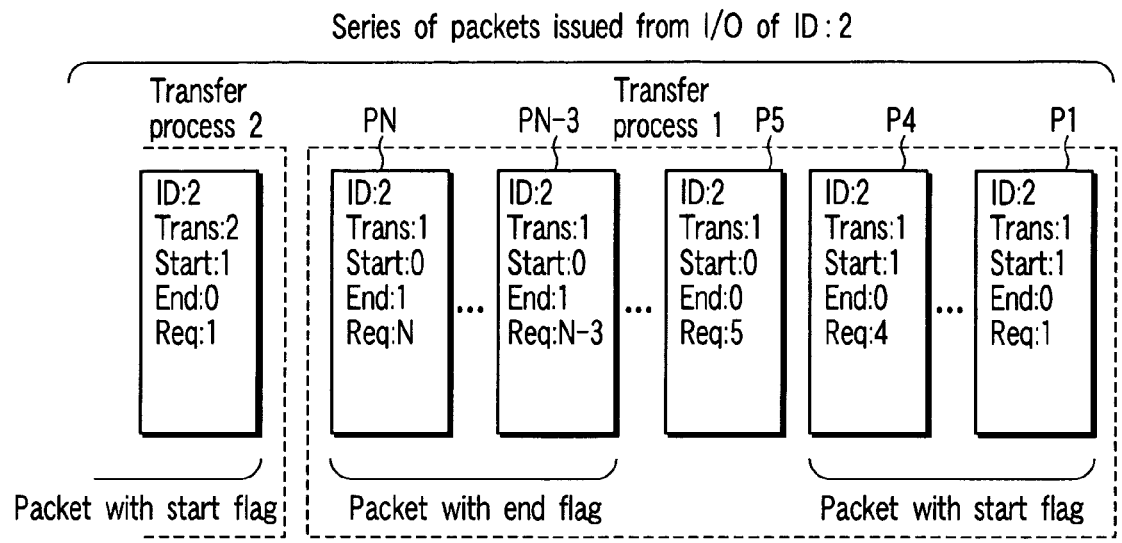
FIG. 2 is a diagram for illustrating the structure of packets formed by an I/O-side data transfer processing apparatus provided in the data processing apparatus of FIG. 1.

There will now be described an embodiment of this invention with reference to the accompanying drawings.

In FIG. 1, the configuration of a data processing apparatus according to one embodiment of this invention is shown. The data processing apparatus is realized as a system such as a computer and an embedded system, for example. As shown in FIG. 1, the data processing apparatus includes a processor 11, I/O-side data transfer processing apparatus 12, memory-side data transfer processing apparatus 13 and a plurality of memories 15.

The processor 11 is a central processing unit (CPU) which controls the operation of the data processing apparatus and uses the plurality of memories 15 as a main memory. The processor 11 executes a program loaded in the main memory and processes data stored in the main memory. The plurality of memories 15 are realized as memory banks and can be operated in parallel.

In FIG. 1, a case wherein four memory banks #0 to #3 are provided is shown as an example. The memory banks to be accessed are sequentially switched in units of data blocks having specified size. For example, when four data blocks are sequentially written into a certain memory address space, memory banks which are different for each data block are accessed. Thus, accesses to the four memory banks, #0 to #3, are made in parallel. In comparison with a case wherein data block groups are sequentially written into the same memory bank, a high-speed write process can be attained. The parallel access operation can be realized by using an interleave control process in which memory addresses are assigned alternately to the four memory banks, #0 to #3.

For example, each memory bank is configured by a large number of pages each having specified size. Page 0, page 4, page 8, page 12, . . . are allocated to memory bank #0. Page 1, page 5, page 9, page 13, . . . are allocated to memory bank #1. Page 2, page 6, page 10, page 14, . . . are allocated to memory bank #2. Page 3, page 7, page 11, page 15, . . . are allocated to memory bank #3. When four data blocks transmitted from the I/O-side data transfer processing apparatus 12 are written into successive memory address spaces, the values of destination addresses (memory addresses) corresponding to the four data blocks are increased in data size units of one page. Thus, the four data blocks are sequentially allocated to the four memory banks in the order of transmission.

The I/O-side data transfer processing apparatus 12 is connected to a plurality of I/O devices 14 to control the I/O devices 14. Further, the I/O-side data transfer processing apparatus 12 functions as a transmission-side device which transfers data to the memory-side data transfer processing apparatus 13 in response to a data transfer request from the processor 11. The I/O-side data transfer processing apparatus 12 includes a packet processing unit 121 and a plurality of transfer control units 122.

The plurality of transfer control units 122 are respectively connected to the plurality of I/O devices 14. Each of the transfer control units 122 performs data transfer with respect to a corresponding one of the I/O devices. The packet processing unit 121 performs a packet forming process for forming data to be subjected to the data transfer process specified by the data transfer request from the processor 11 into packets for each data block having specified data size. The data transfer request is a DMA transfer request which specifies data transfer between a certain I/O device 14 and a memory. The data size of to-be-transferred data specified by one data transfer request is equal to or larger than the total data size of N (N≧2K) data blocks. In this case, K (K≧2) indicates the number of memory banks.

In the data transfer process specified by the data transfer request from the processor 11, the packet processing unit 121 forms N (N≧2K) packets corresponding to N data blocks configuring data to be transferred in the data transfer process. In this case, a destination address (memory address) and an identifier (transfer process identifier) which uniquely identifies the data transfer process specified by the data transfer request are attached to each packet.

The value of the destination address attached to the first packet coincides with a transfer-destination memory address specified by the data transfer request from the processor 11. The value of the destination address attached to the second packet is set equal to (transfer-destination memory address+ data block size) and the value of the destination address attached to the third packet is set equal to (transfer-destination memory address+2×data block size).

For example, the transfer process identifier includes a device ID used to identify an I/O device specified by the data transfer request and a transfer ID used to identify the processing unit of the data transfer process.

Further, in the packet forming process, a start flag indicating the start of the data transfer process is attached to each of the first K packets among the N packets. Also, an end flag indicating the end of the data transfer process is attached to each of the last K packets among the N packets.

The packets formed by the packet processing unit 121 are sequentially transmitted to the memory-side data transfer processing apparatus 13. The memory-side data transfer processing apparatus 13 is a reception-side device which controls the four memory banks 15 and includes a packet processing unit 131 and memory control units 132 of the same number as that of the memory banks 15. The packet processing unit 131 distributes the packets received from the I/O-side data transfer processing apparatus 12 to the four memory control units 132 so that the packets transmitted from the I/O-side data transfer processing apparatus 12 can be sequentially allocated to the four memory banks 15 in the order of transmission. In this case, one of the memory control units 132 on the transmission destination side is determined for each packet according to the destination address contained in each packet.

Each memory control unit 132 has a queue used to store write requests. The queue is configured by a first-in, first-out (FIFO) buffer, for example. The write requests are processed in the order of reception. That is, each memory control unit 132 sequentially fetches write requests held in its own queue and writes data into one of the memory banks which corresponds to the memory control unit 132. Not only a write request from the I/O-side data transfer processing apparatus 12 but also a write request directly supplied from the processor 11 is input to the queue of each memory control unit 132.

Each memory control unit 132 has a function of issuing notification of completion of the data transfer process specified by the transfer process identifier attached to the packet with the end flag to the packet processing unit 131 when data contained in the packet with the end flag is written into the memory bank.

In the present embodiment, since the start flag is attached to each of the first four packets and the end flag is attached to each of the last four packets, the packet with the start flag and the packet with the end flag are supplied to each of the memory control units 132 without fail. Thus, each of the memory control units 132 can detect the start and end of the data transfer process which the memory control unit should process for each data transfer process. Therefore, the memory-side data transfer processing apparatus 13 can detect completion of the data transfer process for each data transfer process without managing the total amount of data to be transferred for each data transfer process.

When notification of completion relating to the same data transfer process is issued from all of the four memory control units 132, the packet processing unit 131 issues an interruption signal and notifies the processor 11 of completion of the data transfer process so as to inform the processor 11 that data has become available.

Next, an example of the packets formed for each data transfer process by the packet processing unit 121 of the I/O-side data transfer processing apparatus 12 is explained with reference to FIG. 2. In this example, it is assumed that a data transfer process from the I/O device 14 with device ID=2 to the memory is performed.

$P_1$ to $P_N$ indicate packets corresponding to N data blocks. Each packet contains block data and a header. The header contains an [ID] field indicating a device ID, a [Trans] field indicating a transfer ID, a [Start] field in which a start flag is set as required, and an [End] field in which an end flag is set as required. In this case, "1" is set as the start flag in the [Start] field of each of the first four packets $P_1$ to $P_4$. Further, "1" is set as the end flag in the [End] field of each of the last four packets $P_{N-3}$ to $P_N$. When the processing unit corresponding to the next transfer descriptor is started, the transfer ID ([Trans] field) used to identify the processing unit is changed.

Figure 3:
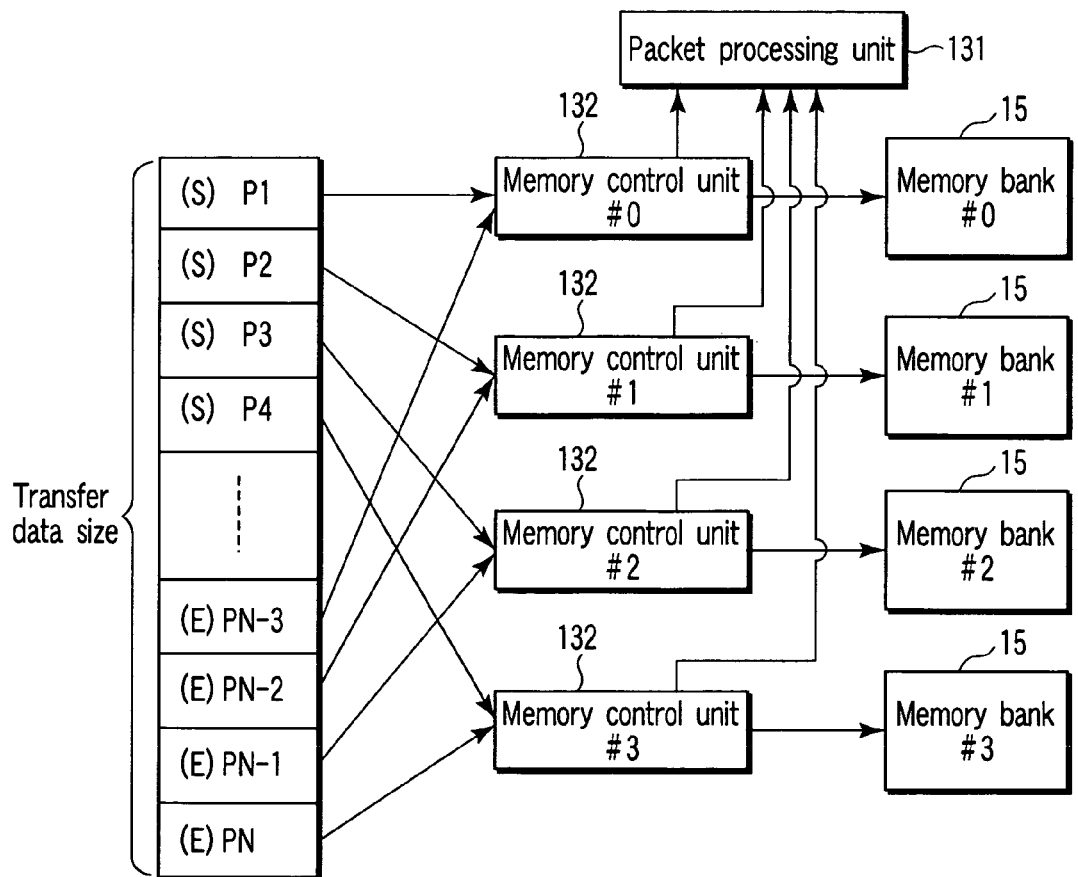
FIG. 3 is a diagram showing a state in which packets are distributed to a plurality of memory control units of a memory-side data transfer processing apparatus provided in the data processing apparatus of FIG. 1.

FIG. 3 shows a state in which the packets $P_1$ to $P_N$ are distributed to the four memory control units 132. In FIG. 3, it is assumed that the memory bank corresponding to the destination address of the packet $P_1$ is memory bank #0.

Packet $P_1$ with the start flag is transmitted to the memory control unit #0 corresponding to memory bank #0, packet $P_2$ with the start flag is transmitted to memory control unit #1 corresponding to memory bank #1, packet $P_3$ with the start flag is transmitted to memory control unit #2 corresponding to memory bank #2, and packet $P_4$ with the start flag is transmitted to memory control unit #3 corresponding to memory bank #3.

Likewise, packet $P_{N-3}$ with the end flag is transmitted to memory control unit #0 corresponding to memory bank #0, packet $P_{N-2}$ with the end flag is transmitted to memory control unit #1 corresponding to memory bank #1, packet $P_{N-1}$ with the end flag is transmitted to memory control unit #2 corresponding to memory bank #2 and packet $P_N$ with the end flag is transmitted to memory control unit #3 corresponding to memory bank #3.

Thus, the packet with the start flag and the packet with the end flag pass through the memory control unit 132 without fail. When the packet with the start flag and the packet with the end flag which belong to the same data transfer process have passed through a certain one of the memory control units 132, it can be determined that a series of data items which should pass through the memory control unit 132 have been all received. Each of the memory control units 132 issues notification of completion indicating that the data transfer process specified by the transfer process identifier (device ID, transfer ID) attached to the packet with the end flag has been completed to the packet processing unit 131 when the operation of writing data contained in the packet with the end flag is completed. A notifying unit 133 of the packet processing unit 131 notifies completion of the data transfer process to the processor 11 when it receives notification of completion relating to the same data transfer process from all of the memory control units 132.

In this case, it is not always necessary to use the start flag and it is only required to attach the end flags to the last K packets. Further, it is not always necessary to attach the transfer process identifier to each packet and it is only required to attach the transfer process identifiers to the last K packets.

Figure 4:
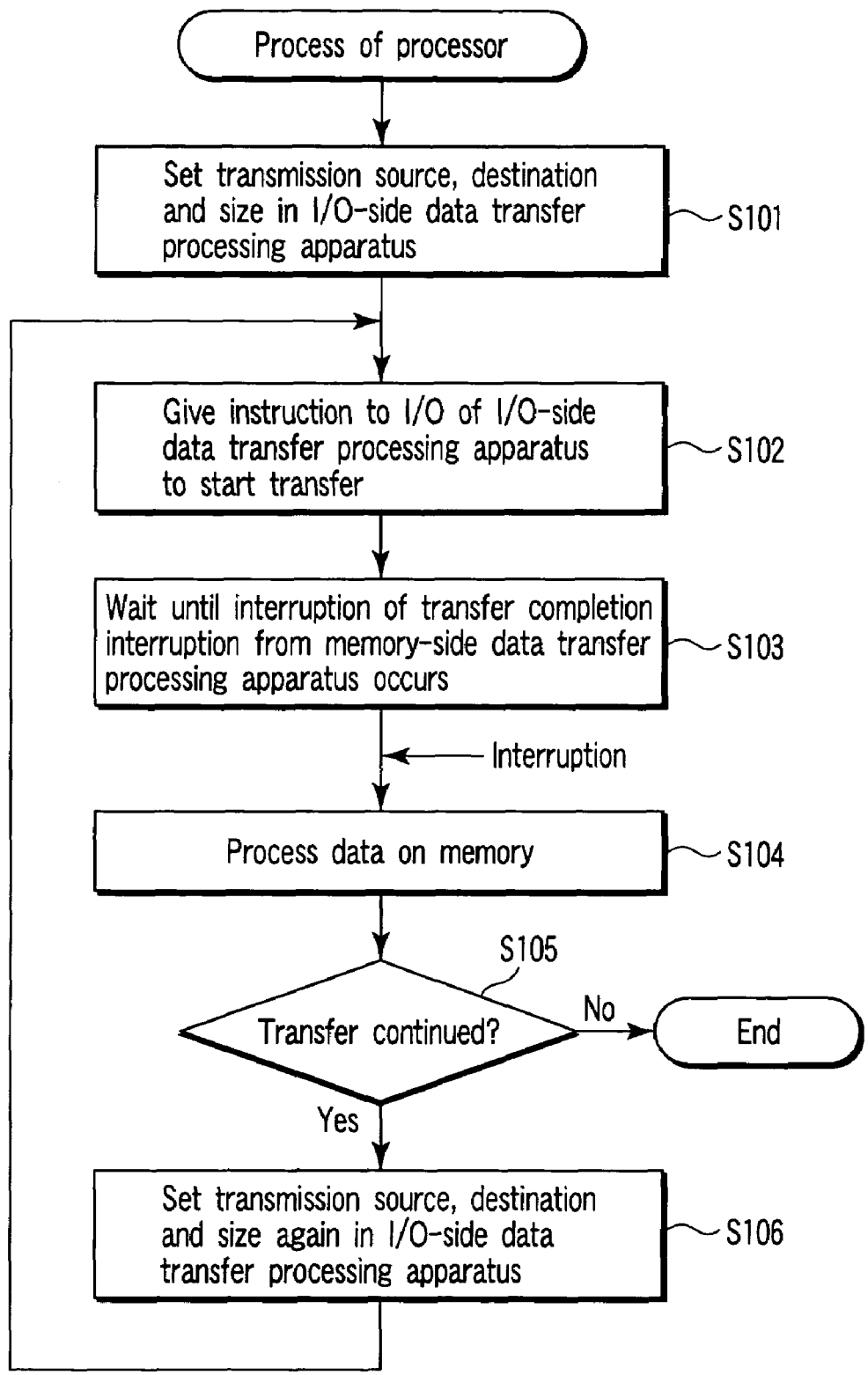
FIG. 4 is a flowchart for illustrating the procedure of a process performed by a processor provided in the data processing apparatus of FIG. 1.

Next, the procedure of the process performed by the processor 11 is explained with reference to the flowchart of FIG. 4.

First, the processor 11 issues a data transfer request (DMA transfer request) to the packet processing unit 121 of the I/O-side data transfer processing apparatus 12 (step S101). The data transfer request is supplied to the I/O-side data transfer processing apparatus 12 via the memory-side data transfer processing apparatus 13 or a bus which directly connects the processor 11 to the I/O-side data transfer processing apparatus 12. The data transfer request contains transmission-source I/O information which specifies an I/O device of the data transmission source, destination address information which specifies a start memory address of the transfer destination, and size information which indicates data transfer size. After this, the processor 11 gives an instruction to the transfer control unit 122 corresponding to the I/O device of the data transmission source to start the data transfer process (step S102).

After this, the processor 11 waits until an interruption (transfer completion interruption) is generated from the memory-side data transfer processing apparatus 13 (step S103). In step S103, the processor 11 can perform a desired process other than the process which deals with data requested by the data transfer request. When completion of the data transfer process is notified by the interruption from the memory-side data transfer processing apparatus 13, the processor 11 starts the process for data transferred into the memory (step S104). If a different data transfer process is necessary ("YES" in step S105), the processor 11 issues a data transfer request (DMA transfer request) to the packet processing unit 121 of the I/O-side data transfer processing apparatus 12 (step S106).

Next, the procedure of the process performed by the I/O-side data transfer processing apparatus 12 is explained with reference to the flowchart of FIG. 5.

The packet processing unit 121 of the I/O-side data transfer processing apparatus 12 divides data transferred from the I/O-side transfer control unit 122 into data blocks of preset size and forms a packet for each data block (step S111). In this case, the packet processing unit 121 sets start flags on the first four packets from start of the transfer and sets end flags on the last four packets (steps S112 to S115). The packet processing unit 121 sequentially transmits the packets thus formed to the memory-side data transfer processing apparatus 13 in the order of formation (step S116). If a different data transfer request is received from the processor 11 ("YES" in step S117), the packet processing unit 121 performs the process of steps S111 to S116 after changing the transfer ID or the like (step S118).

When transfer of all of the packets is completed, the packet processing unit 121 waits for an end instruction from the processor 11 (step S119). When the end instruction is received, the packet processing unit 121 performs the end process to terminate the data transfer process by the I/O device specified by the end instruction (step S120).

A plurality of data transfer processes for transferring data from the plurality of I/O devices to the memories can be performed in parallel.

Figure 6:
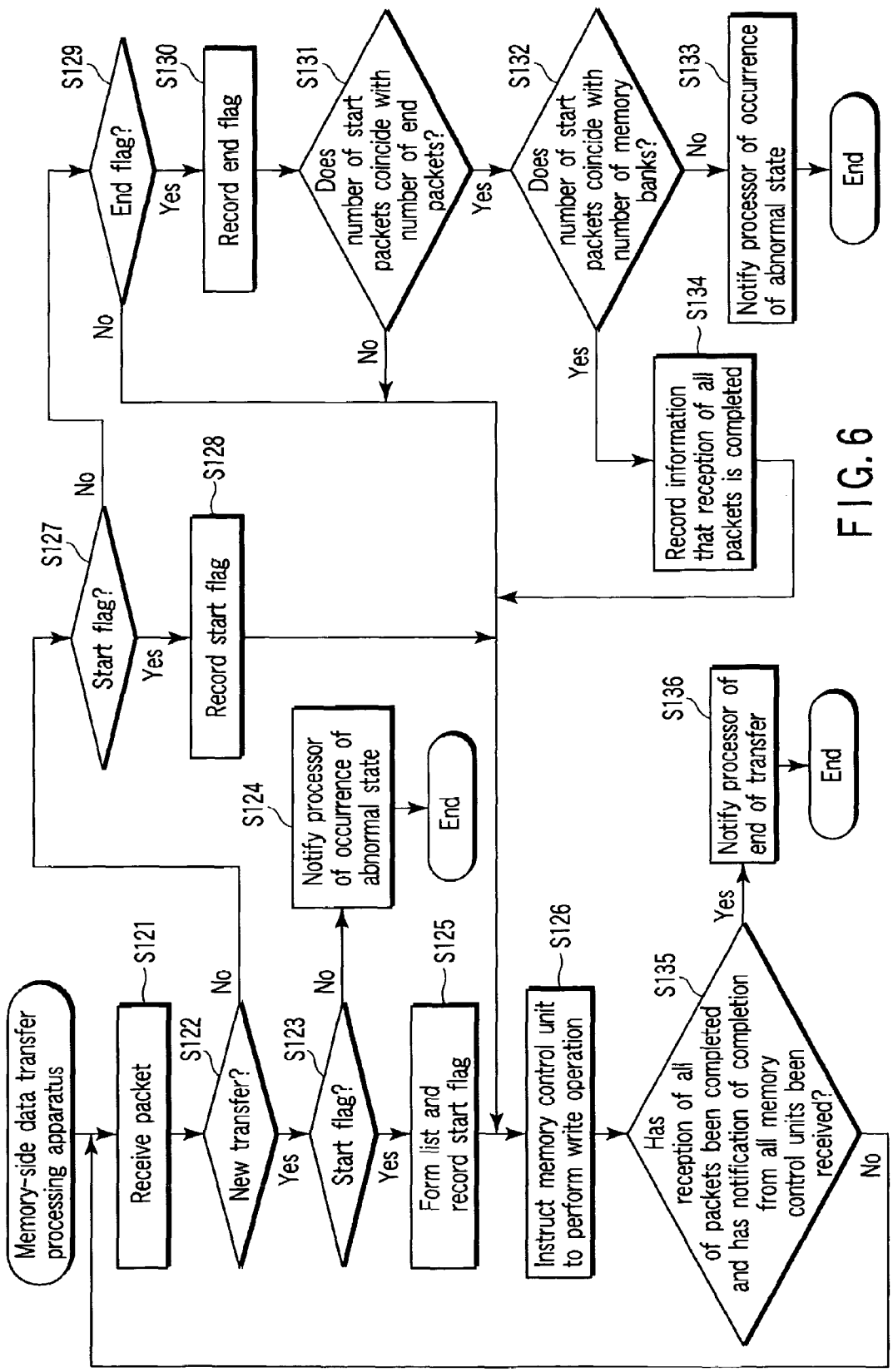
FIG. 6 is a flowchart for illustrating the procedure of a process performed by the memory-side data transfer processing apparatus provided in the data processing apparatus of FIG. 1.

Next, the procedure of the process performed by the memory-side data transfer processing apparatus 13 is explained with reference to the flowchart of FIG. 6.

The packet processing unit 131 of the memory-side data transfer processing apparatus 13 receives a packet transferred from the I/O-side data transfer processing apparatus 12 (step S121). The packet processing unit 131 checks the transfer process identifier (device ID, transfer ID) of the received packet to determine whether or not the received packet is a packet relating to a new data transfer process (step S122). In step S122, whether or not the received packet is a packet relating to a new data transfer process is determined by checking whether the combination of the device ID and transfer ID is a new combination or not.

If the received packet is a packet relating to a new data transfer process, that is, if a new data transfer process has been started ("YES" in step S122), the packet processing unit 131 determines whether or not a start flag is attached to the received packet (step S123). If the start flag is attached ("YES" in step S123), the packet processing unit 131 forms a list which is used to manage the new data transfer process (step S125).

Figures 5, 7:
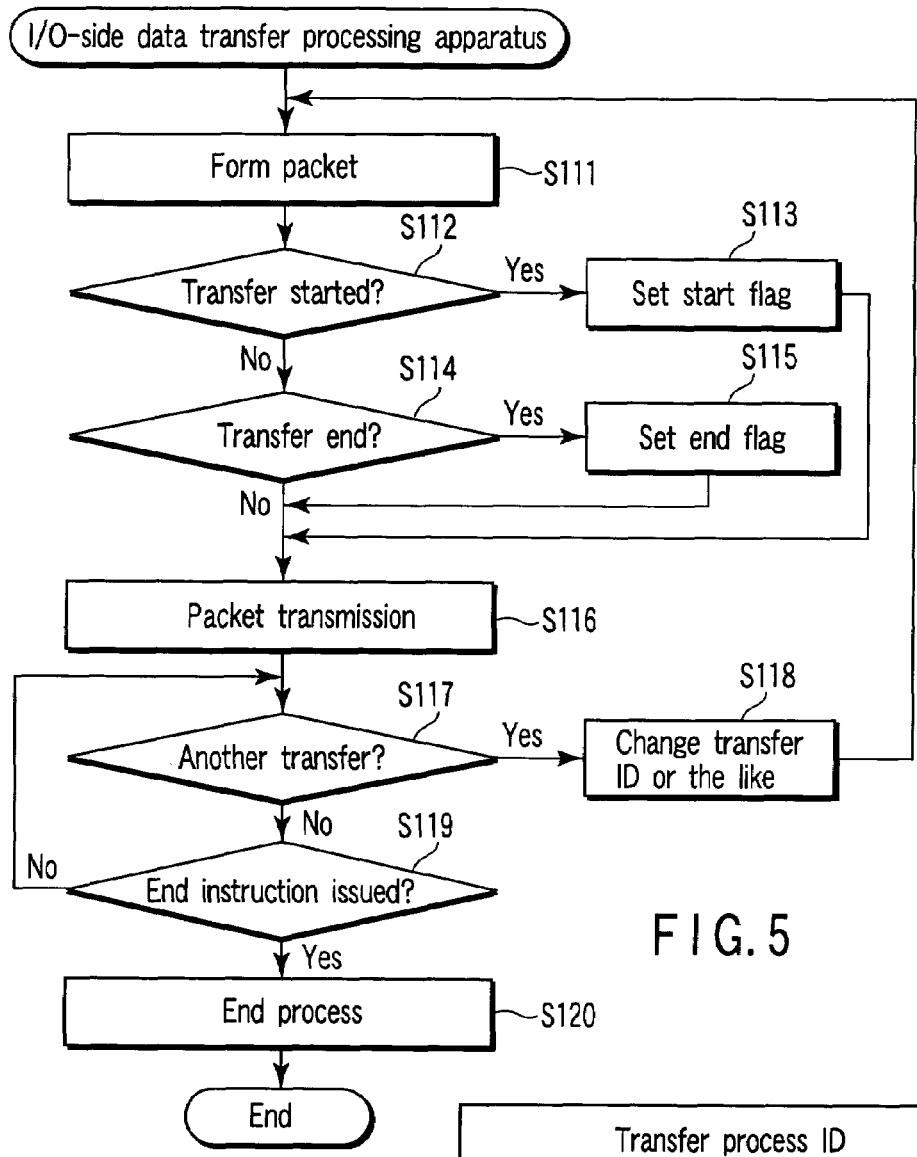
FIG. 5 is a flowchart for illustrating the procedure of a process performed by the I/O-side data transfer processing apparatus provided in the data processing apparatus of FIG. 1.
FIG. 7 is a diagram showing an example of a data transfer processing and managing list used in the data processing apparatus of FIG. 1.

As shown in FIG. 7, in the list thus formed, a transfer process identifier is set to correspond to the new data transfer process. Further, in the list, an area for storing the number of received packets with start flags (the number of start packets), an area for storing the number of received packets with end flags (the number of end packets) and four areas for storing notification of completion are provided.

In step S125, a process of setting the number of start packets=1 is also performed. After this, the packet processing unit 131 supplies a received packet to the memory control unit 132 specified by the destination address of the received packet to instruct the memory control unit 132 to perform a write operation (step S126). If the start flag is not attached ("NO" in step S123), the packet processing unit 131 notifies the processor 11 of occurrence of an abnormal state (step S124).

If the received packet is not a packet which relates to a new data transfer process but a packet relating to the existing data transfer process ("NO" in step S122), the packet processing unit 131 determines whether or not a start flag/end flag is attached to the received packet (steps S127, S129). If the start flag is attached ("YES" in step S127), the packet processing unit 131 supplies the received packet to the memory control unit 132 specified by the destination address of the received packet to instruct the memory control unit 132 to perform a write operation (step S126) after incrementing the value of the number of start packets of the list corresponding to the transfer process identifier of the received packet by 1 (step S128). If the end flag is attached ("YES" in step S129), the packet processing unit 131 increments the value of the number of end packets of the list corresponding to the transfer process identifier of the received packet by 1 (step S130) and then determines whether or not the number of start packets of the list coincides with the number of end packets (step S131).

If the number of start packets does not coincide with the number of end packets ("NO" in step S131), the packet processing unit 131 supplies the received packet to the memory control unit 132 specified by the destination address of the received packet to instruct the memory control unit 132 to perform a write operation (step S126).

If the number of start packets coincides with the number of end packets ("YES" in step S131), the packet processing unit 131 determines whether or not the value of the number of present start packets/end packets is equal to the number of memory banks (step S132).

If the value of the number of present start packets/end packets coincides with the number of memory banks ("YES" in step S132), the packet processing unit 131 records information that reception of all of the packets relating to the data transfer process specified by the transfer process identifier attached to the received packet is completed in a list or the like corresponding to the transfer process identifier, for example (step S134). After this, the packet processing unit 131 supplies the received packet to the memory control unit 132 specified by the destination address of the received packet to instruct the memory control unit 132 to perform a write operation (step S126).

If the value of the number of present start packets/end packets does not coincide with the number of memory banks ("NO" in step S132), the packet processing unit 131 notifies the processor 11 of occurrence of an abnormal state (step S133).

In step S126, each of the memory control units 132 writes a packet transmitted from the packet processing unit 131 into the memory bank. When the write process of writing data contained in the packet to which the end flag is attached into the memory bank is completed, each of the memory control units 132 records notification of completion indicating completion of the write process in a list corresponding to the transfer process identifier added to the packet to which the end flag is attached.

The packet processing unit 131 determines whether or not reception of all of the packets has been completed and notification of completion from all of the memory control units 132 has been received for each of the lists formed (step S135). If there is a list in which reception of all of the packets has been completed and notification of completion from all of the memory control units 132 has been received (step S135), the packet processing unit 131 notifies the processor 11 of completion of the data transfer process corresponding to the list by use of an interruption signal (step S136). Of course, it is possible to determine whether the data transfer process has been completed or not based only on whether notification of completion from all of the memory control units 132 has been received or not without performing the process of detecting completion of reception of all of the packets.

As described above, according to the present embodiment, since the end flag and transfer process identifier are attached to each of the last K packets, the packet with the end flag can be transmitted to all of the memory control units 132.

Therefore, in the memory-side data transfer processing apparatus 131, completion of the data transfer process can be correctly determined by determining whether or not notification of completion relating to the same data transfer process has been issued from all of the memory control units 132. Thus, completion of data transfer can be efficiently notified to the processor 11. Further, the number of packets to be transferred may be different for each data transfer process. However, in the present embodiment, it is not necessary to count the number of transferred packets. Therefore, completion of transfer can be correctly detected by a common procedure for any type of data transfer process irrespective of the number of packets to be transferred.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A data processing apparatus including a processor, a reception-side device which controls K (K≧2) memories which can be operated in parallel, and a transmission-side device which transfers data to the reception-side device in response to a data transfer request from the processor, comprising:

a packet forming unit which is provided in the transmission-side device and forms N (N≧2K) packets corresponding to N (N≧2K) data blocks, the N data blocks configuring data to be transferred in a data transfer process specified by the data transfer request, and an end flag and an identifier which identifies the data transfer process being attached to each of the last K (K≧2) packets among the N packets, and the number of the last K packets being equal to the number of the K memories controlled by the reception-side device;

K (K≧2) memory control units which are provided in the reception-side device and respectively control the K (K≧2) memories;

a packet processing unit which is provided in the reception-side device and distributes the N packets from the transmission-side device to the K memory control units to sequentially allocate the N packets to the K memories in the order of transmission;

units which are respectively provided in the memory control units and each perform a process of writing each packet received from the packet processing unit into a memory corresponding to the memory control unit and perform a process of issuing notification of completion relating to the data transfer process corresponding to the identifier attached to the packet having the end flag attached thereto when the packet having the end flag attached thereto is written into the corresponding memory; and a notifying unit which is provided in the reception-side device and notifies completion of the data transfer process to the processor when notification of completion relating to the data transfer process is issued from all of the K memory control units.

2. The data processing apparatus according to claim 1, wherein the data processing unit is configured to distribute the N packets to the K memory control units in accordance with a destination address contained in each of the N packets from the transmission-side device.

3. The data processing apparatus according to claim 1, wherein the notifying unit is configured to notify completion of the data transfer process to the processor by use of an interruption signal.

4. The data processing apparatus according to claim 1, wherein the data transfer request from the processor is a direct memory access (DMA) transfer request.

5. The data processing apparatus according to claim 1, wherein the transmission-side device is connected to at lest one I/O device and is configured to perform data transfer with respect to the I/O device.

6. A data transfer control method which performs a transfer process of data from a transmission-side device to a reception-side device in response to a data transfer request from a processor and in which the reception-side device includes K ($K \geq 2$) memory control units used to respectively control the K ($K \geq 2$) memories which can be operated in parallel, comprising:

forming N ($N \geq 2K$) packets corresponding to N ($N \geq 2K$) data blocks configuring data to be transferred in a data transfer process specified by the data transfer request from the processor and transmitting the packets from the transmission-side device to the reception-side device, an end flag and an identifier which identifies the data transfer process being attached to each of the last K packets among the N packets, and the number of the last K packets being equal to the number of the K memories controlled by the reception-side device;

distributing the N packets from the transmission-side device to the K memory control units to sequentially allocate the N packets to the K memories in the order of transmission;

causing each of the memory control units to perform a process of writing each received packet into a memory corresponding to the memory control unit and perform a process of issuing notification of completion relating to the data transfer process corresponding to the identifier attached to the packet having the end flag attached thereto when the packet having the end flag attached thereto is written into the corresponding memory; and notifying completion of the data transfer process to the processor when notification of completion relating to the data transfer process is issued from all of the K memory control units.

7. The data transfer control method according to claim 6, wherein the distributing the N packets to the K memory control units includes distributing the N packets to the K memory control units according to destination addresses contained in the N packets from the transmission-side device.

8. The data transfer control method according to claim 6, wherein the notifying of completion of the data transfer process to the processor includes notifying completion of the data transfer process to the processor by use of an interruption signal.

9. The data transfer control method according to claim 6, wherein the notifying of completion of the data transfer process to the processor includes issuing an interruption signal to the processor when the notification of completion is issued from all of the K memory control units.

10. The data transfer control method according to claim 6, wherein the transmission-side device is connected to at least one I/O device and is configured to control the I/O device.

* * * * *